United States Patent
Pratt

(10) Patent No.: US 6,664,921 B2
(45) Date of Patent: Dec. 16, 2003

(54) APPARATUS FOR RECEIVING RANGING SIGNALS

(75) Inventor: Anthony R. Pratt, Rugby (GB)

(73) Assignee: Parthus (UK) Limited, Northampton (GB)

( * ) Notice: Subject to any disclaimer, the term of this patent is extended or adjusted under 35 U.S.C. 154(b) by 0 days.

(21) Appl. No.: 09/731,167

(22) Filed: Dec. 6, 2000

(65) Prior Publication Data

US 2002/0033766 A1 Mar. 21, 2002

(30) Foreign Application Priority Data

Sep. 20, 2000 (GB) .............................................. 0023072

(51) Int. Cl.⁷ .............................. G01S 5/02; H04B 7/185
(52) U.S. Cl. ................................... 342/357.06; 342/445
(58) Field of Search ........................ 342/352, 357.06, 342/357.12, 385, 445, 446

(56) References Cited

U.S. PATENT DOCUMENTS

| | | | |
|---|---|---|---|
| 3,952,304 A | * | 4/1976 | Broniwitz et al. ........ 343/16 M |
| 4,179,696 A | * | 12/1979 | Quesinberry et al. ......... 343/7.4 |
| 5,101,356 A | | 3/1992 | Timothy et al. |
| 5,268,695 A | | 12/1993 | Dentinger |
| 5,317,323 A | | 5/1994 | Kennedy et al. |
| 5,343,212 A | * | 8/1994 | Rose et al. .................. 342/424 |
| 5,347,536 A | | 9/1994 | Meehan |
| 5,457,466 A | * | 10/1995 | Rose .......................... 342/442 |
| 5,543,803 A | | 8/1996 | Serfling et al. |
| 5,805,583 A | | 9/1998 | Rakib |
| 5,917,446 A | | 6/1999 | Greenspan |
| 5,917,448 A | | 6/1999 | Mickelson |
| 5,926,135 A | | 7/1999 | Minkoff |
| 5,952,968 A | | 9/1999 | McDowell |
| 5,990,827 A | | 11/1999 | Fan et al. |
| 5,990,831 A | | 11/1999 | McDowell |
| 6,069,583 A | | 5/2000 | Silvestrin |
| 6,111,895 A | | 8/2000 | Miller et al. |
| 6,114,988 A | | 9/2000 | Schipper et al. |
| 6,259,404 B1 | * | 7/2001 | Parl et al. .................... 342/457 |

FOREIGN PATENT DOCUMENTS

| | | |
|---|---|---|
| DE | 42 23 676 A1 | 1/1994 |
| EP | 0 455 943 | 11/1991 |
| EP | 0 763 749 | 3/1997 |
| EP | 0 806 679 | 11/1997 |
| WO | WO 95/22209 | 8/1995 |
| WO | WO 98/07044 | 2/1998 |
| WO | WO 98/29755 | 7/1998 |
| WO | WO 99/59266 | 11/1999 |

* cited by examiner

Primary Examiner—Dao Phan
(74) Attorney, Agent, or Firm—Kilpatrick Stockton LLP

(57) ABSTRACT

Apparatus for receiving ranging signals (e.g. signals from Global Positioning System satellites) has a receiver coupled to a plurality of spaced antennas. The receiver includes a signal combiner which receives, from a processing circuit, signal components individually representative of a characteristic of the received ranging signals (e.g. signal-to-noise ratio) at a respective antenna and weights the said components to produce a range estimate of improved accuracy in difficult reception conditions. In one embodiment receiver includes a common i.f. channel which filters a combination signal representative of all the incoming signals in order substantially to maintain phase coherence between the incoming signals, yielding improvements in carrier phase measurement and discrimination.

76 Claims, 5 Drawing Sheets

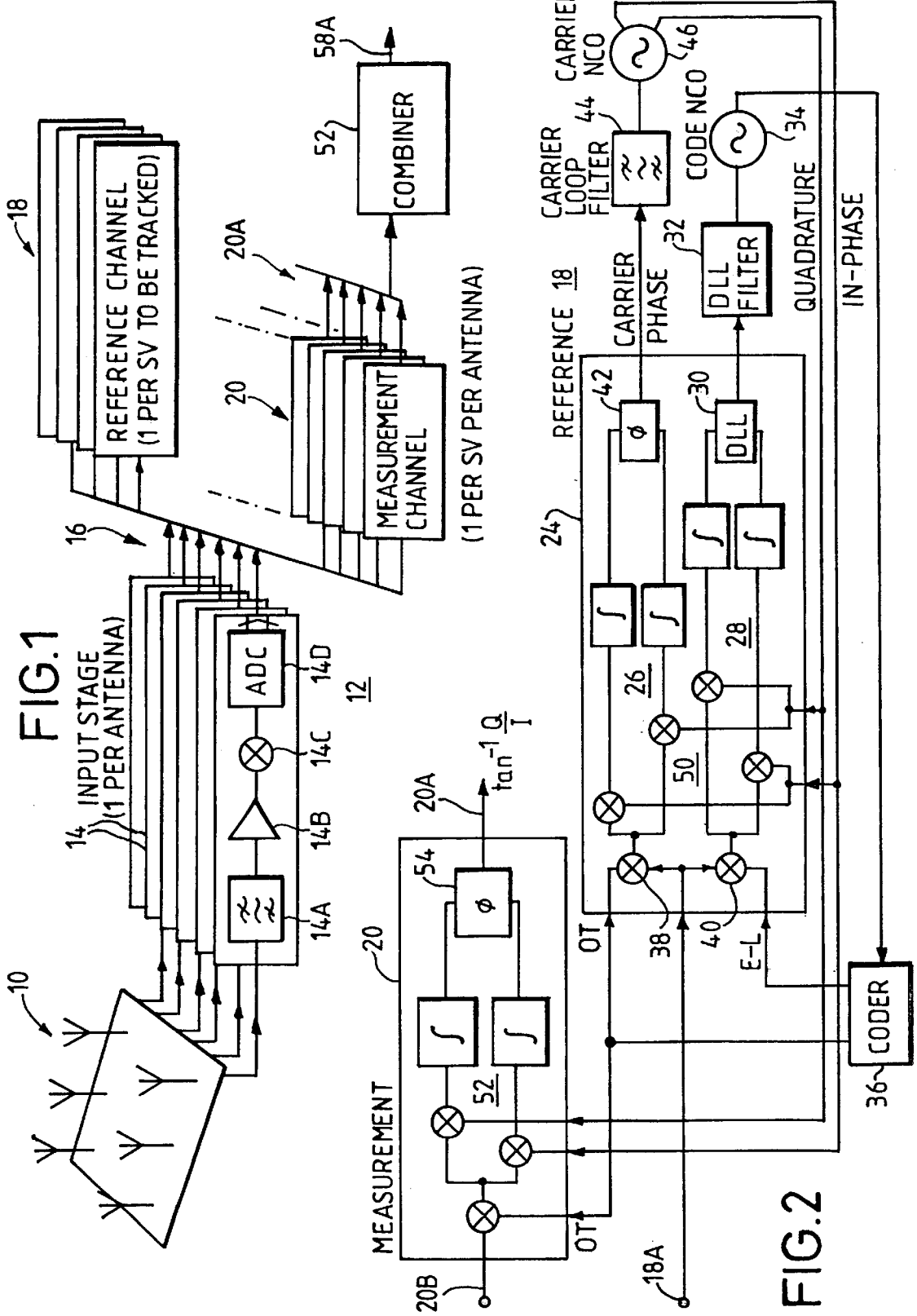

APPARATUS FOR RECEIVING RANGING SIGNALS

This invention relates to apparatus for receiving ranging signals produced by a plurality of remote transmitters which form part of a universal ranging system such as a satellite positioning system, for example, the Global Positioning System (GPS).

The original concept of GPS envisaged user equipment with an antenna having a largely clear view of the sky, whether mounted on aircraft, ships, land vehicles or in portable applications. Increasingly, however, there are requirements for GPS receivers capable of operating in poor signal conditions and which operate at higher than previously accepted accuracies. Weak signal conditions in ranging systems such as the GPS satellite-based system, are usually caused by obstructions or multipath propagation. Such reception conditions often occur inside buildings, but also outdoors in densely built-up areas or under foliage. The region over which a GPS receiver can be expected to operate can be improved by maximising the received power-to-noise ratio for each satellite signal.

Signal reception of GPS inside buildings is characterised by a transmission model that has no dominant mode since most signals arrive at the receiver after one or more reflections. This transmission model implies that the signal has Rayleigh fading statistics. Such statistics are generally found when there are multiple signal paths to the receiver, each model allows the Central Limit Theorem to be invoked to describe signal amplitude. The magnitude of the resulting signal, free of signal phase measurements, may then be established as a two-dimensional normally distributed random variable. The magnitude is a first order $\chi^2$ distribution with the characteristic Rayleigh probability density function:

$$P(R)=(R/\sigma^2)\exp(-R/2\sigma^2)$$

The direction of the signal arrival is not well defined in this transmission model and may come from any direction. In reality, this will be constrained by physical factors such as nearby windows capable of GPS signal transmission. For the most part, it will also not be possible to determine the polarisation of the signal. GPS satellite transmissions are right-hand circularly polarised but become circularly or elliptically polarised on reflection from metallic objects.

In the circumstances described above, the signal field can be subject to deep fades, similar to those experienced by FM radio receivers in automotive environments.

Another difficulty is the shrinking physical size of GPS receivers bringing, amongst other problems, the danger of self-jamming due to electromagnetic noise from small devices with large gate counts exceeding local thermal noise levels. In addition, the external electromagnetic environment is deteriorating as a result of increasing congestion in the electromagnetic spectrum. As an example, digital broadcast television, which is due to expand rapidly in coming years, has relatively high out-of-band emissions compared with previous systems. Other satellite communication services are being allocated spectrum space in bands adjacent GPS frequencies.

This invention aims to counter such difficulties by providing a receiver system having a plurality of antennas. According to a first aspect of the invention, apparatus arranged to receive ranging signals produced by a plurality of remote transmitters which form part of a universal ranging system comprises a radio receiver unit having a plurality of radio frequency (r.f.) input connections, and a plurality of spaced-apart antennas each connected to a respective said input connection, wherein the receiver unit includes: an antenna signal processing circuit responsive to the ranging signals for producing output signals including components each individually representative of at least one characteristic of the ranging signals received at a respective antenna; and a signal combiner configured to receive the output signals, to monitor, for each of a plurality of the said remote transmitters, at least one characteristic of the ranging signals from that remote transmitter via the different antennas, and to weight one or more of the said components to yield a range estimate.

According to a second aspect of the invention, the apparatus has a receiver unit with a signal selection arrangement configured to receive the output signals, to monitor, for each of a plurality of the said remote transmitters, at least one characteristic of the ranging signals from that remote transmitter via the different antennas, and to select one or more of the said components to yield a range estimate.

The signal combiner or selection arrangement is preferably configured to weight or select the components according to the signal-to-noise ratios of the ranging signals received from at least one of the transmitters, advantageously from each of them. Alternatively, or in addition, the signal combiner or selection arrangement may be configured to weight or select the components according to the amplitudes of the ranging signals whether from one or several of the transmitters.

Typically, the antenna signal processing circuit includes at least one code-tracking loop for tracking code modulation of the ranging signals when received by the antennas. The selection may be performed periodically so as to select one of the ranging signals the amplitude of which is greater than the others, and then to apply the selected signal to the code tracking loop. There may be a number of code tracking loops, the signal selection arrangement being configured periodically to select a number of the ranging signals by weighting the magnitudes according to a predetermined weighting scheme which is dynamically variable, being adapted to the changing electromagnetic conditions as happens, for instance, when a motor vehicle containing the apparatus passes through a built-up area.

In the last-mentioned situation, the changing electromagnetic environment is largely due to varying intensities of signals reflected from adjacent buildings. Thus, the signal combiner or selection arrangement may be specifically configured to weight or select the components due to signals from the different antennas according to their multi-path content.

As an alternative to using a code-tracking loop for tracking code modulation of the ranging signals, a parallel correlator structure may be used.

Although, in the case of GPS, code-tracking may be relied upon to provide position fixes, improved accuracy may be obtained by measuring carrier phase. In the context of the present invention, a receiver unit including a carrier phase tracking loop may include a phase-shifting arrangement operable to apply a selected phase shift to a selected or weighted signal, the magnitude of the phase shift being dynamically adjusted according to the antenna via which the selected or weighted signal is received. Accordingly, it is possible to configure the phase-shifting arrangement to adjust the phase shift in a manner that maintains coherent phase matching between ranging signals received via the different antennas to improve phase tracking accuracy. Coherent phase tracking may be maintained in order to allow switching between different selected ranging signals from different antennas.

Phase and amplitude taper multiplication coefficients may be applied to the ranging signals from the different antennas using, for instance, an adaptive equaliser. Phase taper, then, can cause the ranging signals received at different antenna elements from a particular direction to reinforce each other, giving a means of selecting signals from a particular direction (e.g. from a particular transmitter), and for rejecting signals received from other directions, e.g. due to unwanted reflections or other sources of interference. An amplitude taper can act as a spatial filter altering the combined beam pattern of the antennas as an array.

According to a third aspect of the invention, apparatus arranged to receive ranging signals produced by a plurality of remote transmitters which form part of a universal ranging system comprises a radio receiver unit having a plurality of r.f. input channels and a plurality of spaced-apart antennas each connected to a respective said input channel, wherein: the receiver unit includes at least one antenna signal processing circuit responsive to the carrier phases of the ranging signals received via at least one of the antennas; each input channel i includes a multiplying element arranged to combine a respective first multiplier signal $M_i$ with an incoming signal in the channel, the multiplier signals constituting an orthogonal set of signals; and the receiver unit further includes a combining element for combining the multiplier output signals resulting from combining the incoming signals with the multiplier signals, a common intermediate frequency channel including common filtering means for receiving the multiplier output signals from the combining element, an analogue-to-digital converter (ADC) coupled to an output of the common channel, and a processor for applying second multiplier signals to a digitised signal obtained from the ADC thereby substantially to isolate from each other signals representative of respective incoming signals from respective antennas, each second multiplier signal corresponding to or being the same as the first multiplier signal for the respective antenna; whereby phase coherence is maintained between the different signals associated with the different antennas.

In such apparatus, as well as apparatus as described above in accordance with the first and second aspects of the invention, the antennas may have different polarisation characteristics, the processor being programmed to combine digitised representations of the different antenna signals to weight or select received signals having a predetermined polarisation. The antennas may comprise a pair of antennas each formed as a linear element, the linear elements being arranged perpendicularly to each other so that, according to the way in which the digitised representations of the signals are combined, the receiver unit selects received signals of right-hand circular polarisation or left-hand circular polarisation. By arranging for the processor to be programmed to weight and combine the digitised representations of the different antenna signals, it is possible to select received signals of elliptical polarisation. In such cases, the processor is preferably configured to implement sum and difference networks. The digitised representations may be combined variably, e.g. in an adaptively varying manner in order to optimise signal reception in a multipath environment.

The processor may be programmed, in addition, to apply selected weightings to the signals isolated after passing through a common channel in the receiver unit in order to tailor the response of the receiver unit to favour received signals having a predetermined characteristic. Such weightings may be adaptively variable.

In preferred apparatus having a common channel for signals representative of incoming signals from a plurality of different antennas, the receiver unit may have input channels which include a pair of sub-channels for I and Q components of each respective incoming signal, the processor being programmed to combine the I and Q components after the isolation step.

CDMA techniques may be used in the receiver unit to combine signals received from individual transmitters at different antennas in order to feed them through a common channel which maintains phase coherence and which, in particular, can filter signals with a constant group delay and, then, subsequently to separate them for further processing. Accordingly, the receiver unit may include a multiplying combiner stage for each channel which multiplies the incoming signal from each antenna by a spreading code assigned to that antenna. The signals may then be combined by adding and feeding them through the common channel. Corresponding despreading codes may be applied at the end of the common channel in order to separate the signals representative of the incoming signals from different antennas. The spreading and despreading codes may be signals constituting an orthogonal set, as mentioned above.

It will be appreciated that much of the receiver architecture may be implemented in software. There is also a choice as to the point in the receiver chain at which analogue signals are converted to digital form. Thereafter, processing may take place by hardwired logic or software processing. It will also be appreciated that the references to channels above include virtual channels whereby circuitry is shared between channels on a multiplexed basis or where different channels are formed in the software routines.

According to a further aspect of the invention, apparatus arranged to receive ranging signals produced by a plurality of remote transmitters which form part of a universal ranging system comprises a radio receiver unit having a plurality of radio-frequency (r.f.) input channels, and a plurality of spaced-apart antennas each connected to a respective said input channel, wherein the receiver unit includes an arrangement for coherently combining and processing signals representative of the ranging signals received by the antennas from each of a plurality of the transmitters, the arrangement advantageously includes a common signal processing channel including common filtering means to maintain phase coherence between output signals associated with any one of said transmitters, being signals extracted from the common channel and representative of the signals received at the antennas from that transmitter. Such apparatus can allow the individual adaptation of antenna array sensitivity pattern for each of the plurality of transmitters, irrespective of the line-of-sight directions of the other transmitter as viewed from the antennas.

Ranging signals may be received from remote transmitters in the form of earth-orbiting satellites, as in a GPS embodiment. Terrestrial systems are also possible, as are combined systems in which one or more of the transmitters is an earth-orbiting satellite, and one or more others are so-called "pseudolites" being transmitters which, in a GPS embodiment, transmits signals in the same format and at the same frequency as satellite-based transmitters.

The extent to which reception quality can be improved is influenced by the spacing of the antennas. In most embodiments, the antenna elements are much closer together than the GPS code phase wavelength (300 meters). However, the ranging signal wavelength at GPS is 19 cms for the L1 transmissions. It follows that carrier phase outputs from different antennas spaced by distances of the same order will be different, giving the ability to weight and select signals for improved reception, as described above.

However, the invention is not limited to apparatus having such antenna spacings. Advantages can be gained by placing the antennas with a spacing approaching the maximum possible afforded by the platform in question, such as at the front and rear of a motor vehicle. Advantages can be gained by having several antennas forming an array in which the inter-antenna spacing between neighbouring antennas is less than $\lambda/2$ where $\lambda$ is the wavelength of the ranging signals in air, but with the maximum span of the array greater than $5\lambda$. In the general case, the antennas are spaced apart by 50 mm or more to provide signals whose magnitudes are to some degree statistically independent.

Other aspects of the invention include receiving ranging signals via at least two antennas for independently sampling the local signal field, and employing a simple algorithm to select the largest signal from the two antennas, or to favour receiving direction to select transmitters having independent fading characteristics. Processing of the signals from each satellite is performed separately in choosing the selection or weighting of the signals. Processing may be performed incoherently or coherently, the advantage of coherent processing being that it allows use of carrier phase differences between the signals received from individual transmitters at the different antennas to be employed in improving reception. Thus, application of a phase shift to one of the antennas may by used align its phase with that of the signal received at one of the other antennas. A steering function may be applied in this way to the antenna signals with the maximum gain pointing in the direction of arrival of the required signal. This phase taper technique allows a 3 dB improvement in the signal-to-noise ratio using two antennas.

As mentioned, above, both amplitude and phase taper may be used to maximise the signal extracted from the processor stages in the receiver unit. Both amplitude and phase taper functions may be changed dynamically to maintain the GPS signal from a chosen satellite at its maximum value, the amplitude and phase taper being adapted to the signal conditions.

One other feature of the preferred embodiment of the present invention is the use of CDMA to pass GPS signals continuously through common parts of the receiver. This has the advantage of improving the signal-to-noise ratio of each of the satellite signals being observed. Furthermore, there is no requirement to select a master GPS signal; all signals have equal importance.

One of the aspects of the invention referred to above is a special arrangement of antennas allowing discrimination between signals of different polarisation. Typically, the linear elements of the antenna referred to above consist of a pair of dipoles arranged in crossed format. Rather than connecting the elements to a coupling network to form a combined antenna sensitive to signal fields with either left-hand or right-hand circular polarisation, in the present preferred embodiment, both antenna signals pass through the receiver unit and associated correlator structure phase coherently. Subsequent digital signal processing is arranged to sum the two antenna signals with either a plus 90° or minus 90° relative phase shift with the consequence that the receiver unit can be made to choose either left-hand or right-hand circular signal polarisation. The alternative of making the system sensitive to elliptical polarisation, as referred to above allows any form of such polarisation to be accommodated by suitable choice of the gain relationship between the channels.

The invention will now be described by way of example with reference to the drawings in which:

FIG. 1 is a block diagram of a first GPS signal receiving system in accordance with the invention;

FIG. 2 is a more detailed block diagram showing reference and measurement channels of a receiver unit forming part of the apparatus of FIG. 1;

Figure 3:
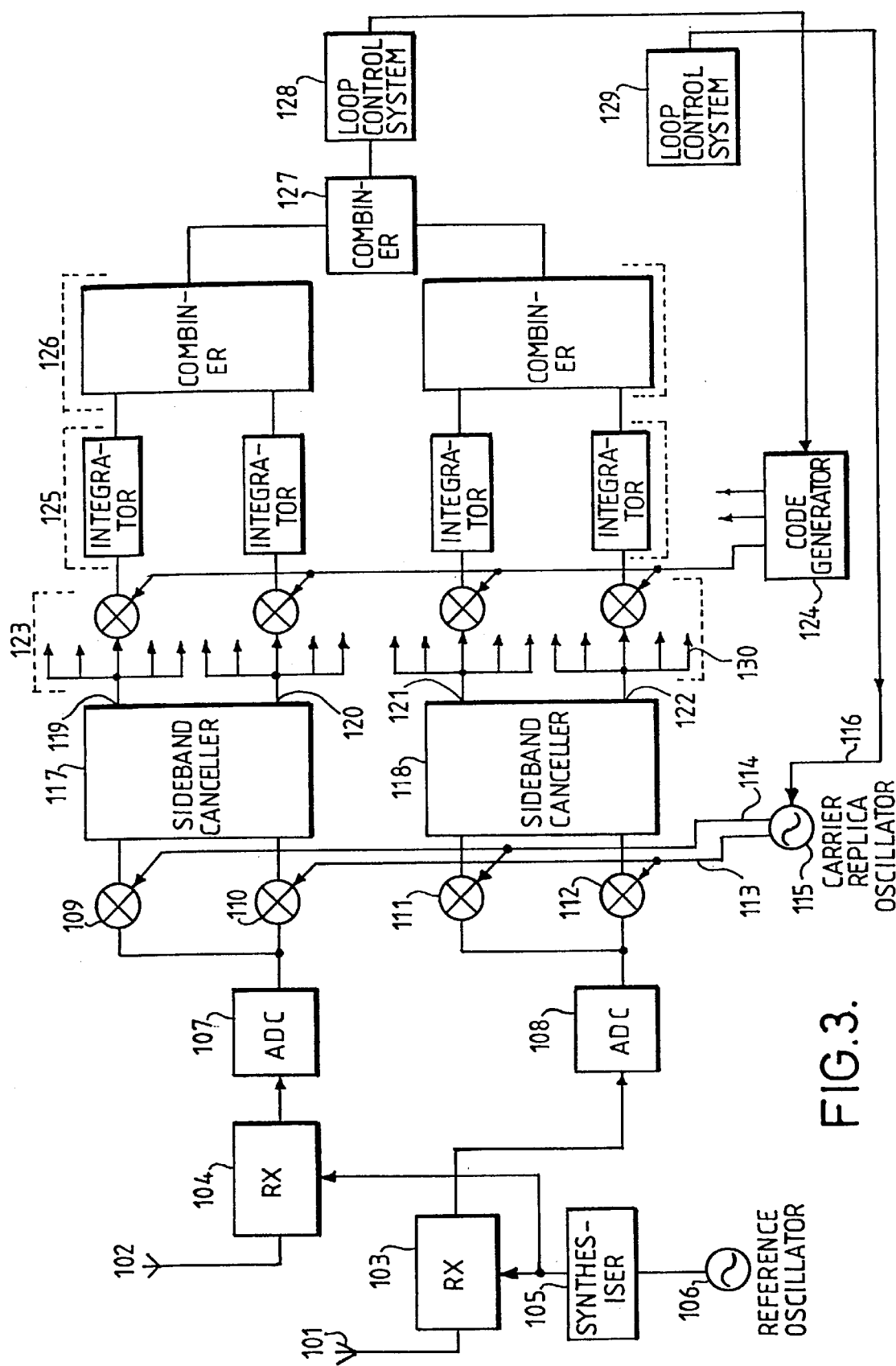
FIG. 3 is a block diagram of a second receiver system in accordance with the invention.

Referring to FIG. 1, in a first embodiment of the invention, multiple antenna GPS receiver apparatus has a multiple antenna array 10 comprising a number of antennas in a spaced-apart arrangement. The array is coupled to a receiving unit 12, each antenna feeding signals to a respective input stage 14 of the receiver unit 12. Each input stage 14 has filtering and amplifier elements 14A, 14B, a downconvertor 14C and an analogue-to-digital converter (ADC) 14D. One of the antennas is selected as a reference source, the corresponding output 16 being coupled to a number of reference channels 18, each of which is arranged to process the signals from a respective visible member of the GPS satellite constellation. In FIG. 1, four reference channels are shown, but it will be appreciated that different numbers of reference channels may be established according to the number of satellite transmitter signals to be processed. The signals from the other antennas, after amplification, downconversion and digitisation in the respective input stages 14, are fed to measurement channels 20, at least one for each received satellite signal at each antenna other than the reference antenna, so that each measurement channel processes a signal representative of the input signal from one satellite as received at one respective antenna. The outputs from the measurement channels are representative of the carrier phase of each transmitter at each antenna.

Referring to FIG. 2, in each reference channel code and carrier tracking loops are established for each visible member of the satellite constellation. The code and carrier loops include code and carrier replica generators which are used in a product or correlation detection arrangement. In this example, the reference channel has a correlator stage 24 with four correlators each having input mixers, and an integrator. A first pair of correlators 26 operates on an on-time version of the code replica and in-phase and quadrature versions of the carrier replica. The other pair 28 of correlators operates on a composite version of the code replica formed from the early and late components of the code, each member of the pair operating on versions of the carrier replica which are in phase and quadrature. Referring to FIG. 2, the code replica is formed in a conventional manner by feeding the outputs of the integrators in the second pair 28 of correlators to a delay locked loop 30 and thence to a delay locked loop filter 32 which controls a numerically controlled oscillator 34. This acts as a clock for a pseudo random bit sequence code generator 36 for generating on-time (OT) and early-minus-late (E–L) versions of the code for the satellite signal being received via input 18A. As will be seen from FIG. 2, the OT and E–L versions of the code are fed to input mixers 38, 40 for the carrier loop and code loop respectively.

The first correlator pair 26 feeds a phase detector 42 producing a signal representative of carrier phase which is then filtered by a carrier loop filter 44 for controlling a second numerically controlled oscillator 46. This NCO 46 is arranged to produce quadrature outputs as a carrier replica for feeding two further mixers 50 in the correlator pairs 26, 28, as shown.

The tracking loops settle with code phase and carrier phase estimates appropriate to the selected satellite and antenna combination.

As one alternative, the reference channel may have six rather than four correlators, one operating on an early version of the code replica and the other on a late version.

The individual antenna elements of the array 10 are normally close together, as measured on the scale of a GPS code phase wavelength (300 m). However, carrier phases for outputs from other antennas, but for the same satellite, are different since the antenna element spacing is on the same scale as the carrier wavelength (19 cm for L1 in GPS). The measurement channels 20 for these antenna-satellite combinations are established to receive the code and carrier replicas generated in the reference channel 24. Accordingly, referring to FIG. 2, only the on-time (OT) code version from the coder 36 is applied to the measurement channel 20, together with the quadrature and in-phase carrier replica versions. Each measurement channel 20, then, has a correlator pair 52 with integrators which feed a carrier phase detector 54 producing a signal representing the phase of the particular antenna-satellite combination for that channel (at output 20A). By using the on-time code replica version and carrier replica signals from the reference channel 18 for a particular satellite, the measurement channels corresponding to the same satellite operate at least approximately at the peak value of the code correlation function. However, the carrier phase measurements are different to the extent of the resolved line-of-sight differences between the reference antenna and the other antennas of the array 10. The outputs 20A (see FIG. 1) from the in phase and quadrature correlator channels are connected to feed $\tan^{-1}$ representations to a combiner 58 the output of which is a spatially filtered representation of the signal from the corresponding satellite.

The combiner 58, in its simplest form, forms the sum of the input antenna measurements after they have been multiplied by amplitude and phase taper functions. The choice of the phase and amplitude multiplication coefficients determines the spatial filtering characteristic. A least-mean-square (LMS) algorithm, for example, may be used to maximise the signal-to-noise ratio at the combiner output 58A. If an adaptive equaliser is used to determine the phase and amplitude tapers, the early stages of adaptive processing are likely to be characterised by noise reduction subject to certain directional gain constraints rather than signal enhancements.

As will be seen, the arrangement described above with reference to FIGS. 1 and 2 has two particular architectural characteristics:

(a) the antenna array processing is performed entirely in the digital processing section of the GPS receiver, and (b) the antenna array processing and the related spatial gain pattern can be different for each satellite in the GPS satellite constellation.

An alternative receiver system embodying principles similar to those contained in the apparatus of FIG. 1 is shown in FIG. 3. This embodiment is in the form of a two-channel satellite positioning system receiver featuring antenna diversity. It will be appreciated, of course, that the illustrated arrangement can be expanded to receive signals from more than two antennas.

This system has two antennas 101, 102 which are coupled to two front end receiver circuits 103, 104. The front end receiver circuits are not completely independent in that, in one preferred embodiment, they share common local oscillator signals derived from a fixed frequency synthesizer circuit 105. The synthesizer circuit 105 is coupled to a reference oscillator 106 of fixed frequency. Down-conversion of the received satellite signals takes place in each of the receiver circuits to an intermediate frequency (i.f.) at which the signals are sampled in time and digitized in ADCs 107, 108. The outputs of the ADCs are coupled to further down-converters 109 to 112 which are connected to variable frequency sources 113 and 114. Each ADC therefore yeilds two output signals which have been sampled in time so that the resulting i.f. samples are substantially separated by 90 degrees in phase, the signals 113, 114 having identical frequencies but differing in phase by substantially 90 degrees. The signals 113, 114 are formed in a signal generator 115 which has a control input 116. The outputs of the four further down-converters 109–112 are combined in sideband canceller circuits 117, 118 to substantially remove the unwanted sideband formed in the outputs from down-converters 109–112. The output of the second down-conversion step is at base-band. The outputs of the sideband cancellers 119 –122 are representations of the in-phase and quadrature base-band equivalents of the two received satellite signals.

The outputs of the sideband canceller circuits are coupled to code a plurality of de-spreading circuits 123. The de-spreading circuits are coupled to a source 124 of code replica signals representative of the signals emitted from the satellites. As in the previously described embodiment, a multiplicity of versions of the replica signals are generated with the feature, in this GPS embodiment, of having different delays in the range to the satellite. Pairs of replica signals are coupled to integrator units 125, which, along with the replica signal generator 124, form a circuit whose output signals are representations of the cross-correlation of the received signal with the signal replicas. This circuit, therefore, substantially performs the function of a matched filter which is matched to the satellite transmitted signal. The outputs of the two integrator units 125 are combined in each channel in respective first combiners 126 to produce a control signal component for a particular respective antenna-satellite combination.

During the process of signal acquisition, the signal replica generator is approximately aligned with similar signals arriving from the satellite. The multiplicity of signals is used initially to make approximate estimates of the range to one of the satellite signal sources. The outputs of each integrator pair responds each of the replica signals to make different representations of the cross-correlation co-efficient. By appropriate combination of the respective control signal components, these signals form a control signal to adjust the signal replica generator so that a chosen signal replica is aligned with the received satellite signal, or to form a control signal so that the phase of the carrier signal replica generator 115 can be brought into phase alignment with the received signal.

Accordingly, similar outputs from the two channels are fed into a combining circuit 127 which is coupled to a control system 128 which is, in turn, coupled to the signal replica generator 124. The action of the control system 128 is to maintain the alignment of the signal replica circuit 124 in the first instance. This second combiner 127 is used to join the outputs of the two receivers and is also coupled to a control system 129 whose function is to maintain the phase of the carrier replica signal approximately the same as that from the two antennas.

The circuits 126, 127 combining the outputs from the channels coupled to the two antennas may take several forms. The simplest embodiment is a circuit which forms the weighted sum of the two signals. The weighting function may be derived from the signal-to-noise ratio of each antenna channel or may be used to selectively couple just one of the channels to the input of the control system or systems.

As will be understood from the indication of parallel outputs 130 from the sideband cancellers 117, 128 in FIG. 3, separate pairs of correlators and subsequent control systems are established for the received signals of each of a number of satellites to be employed.

In order for the phase measurements for each antenna element to be truly phase coherent, it is desirable for the gain, filtering and down-conversion processes to be identical for each antenna channel. This is difficult to achieve in separate receivers but can be partially arranged using local oscillators for the down-conversion stages. However the gain and phase signatures and variations induced in the signals by non-identical filters and amplifier stages are difficult to control.

Figure 4:
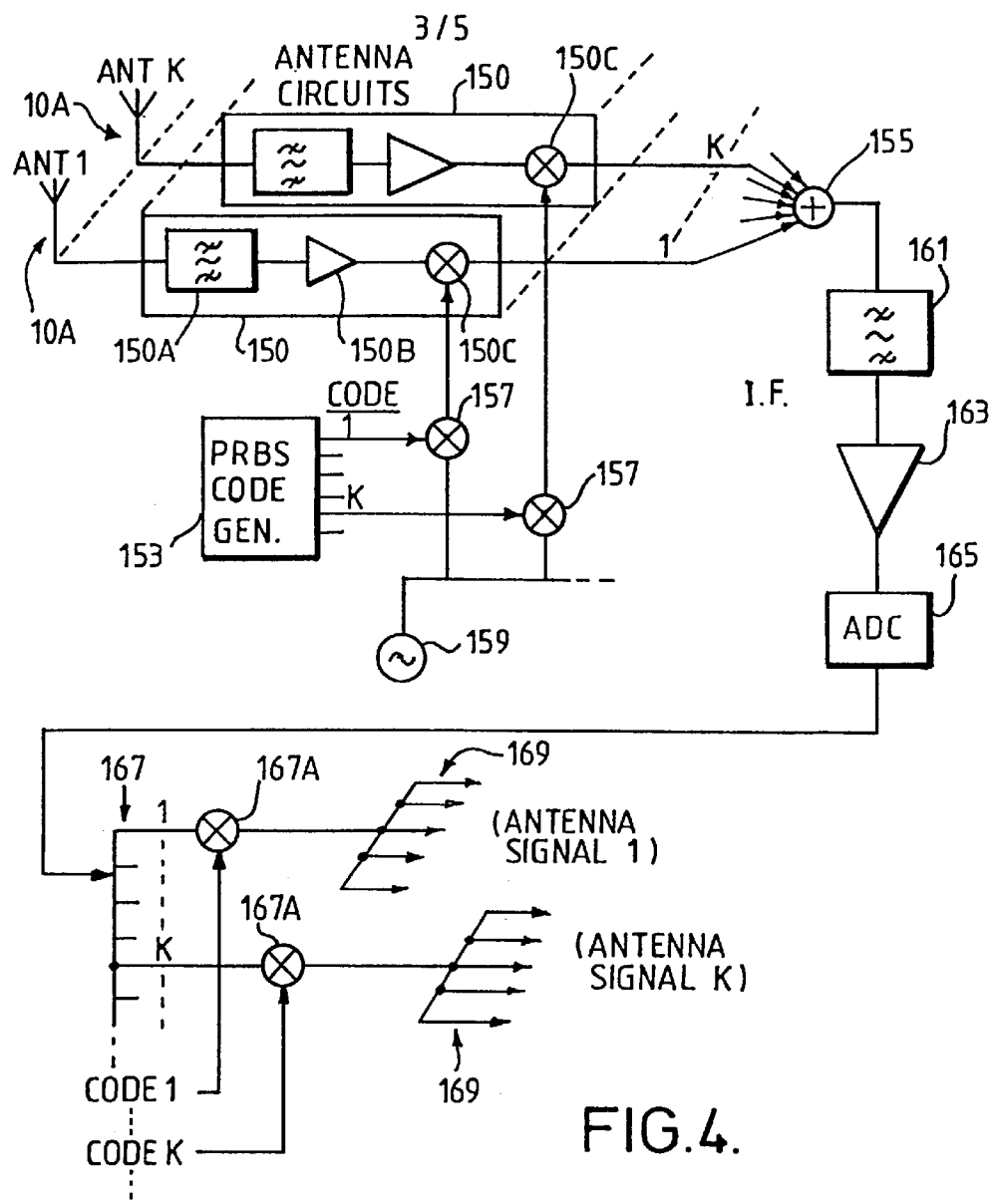
FIG. 4 is a block diagram of a third receiver system in accordance with the invention, having a common channel for signals emanating from a plurality of antenna elements.

Referring to FIG. 4, a simple solution uses identical circuits to provide for the gain, filtering and down-conversion for all antenna circuits. In this arrangement, the separate antenna circuits are code-division-multiplexed prior to most of the radio frequency (r.f.) and intermediate frequency (i.f.) processing. In the example shown, only the front end filtering and low-noise amplifier units 150A, 150B are individual to each antenna element 10A. Stable gain or phase variations from channel to channel would, in an adaptive system, be removed by adapting to a specific performance attribute. However, variations in group delay signatures would not be removed by this form of adaptive processor. This is where the spread spectrum properties of code-division multiplexing shows a clear advantage over time division multiplexing (which degrades signal to noise ratio) and frequency division multiplexing (which renders imperfect group delay signatures).

As shown in FIG. 4, the front end antenna circuits 150, of which there is one for each antenna, contains a bandpass filter 150A and a low-noise amplifier 150B. In each circuit these feed mixer stages 150C where, in each channel, the antenna signal is multiplied by a respective multiplier signal obtained from a PRBS (pseudo random bit sequence) code generator 153. Since the code generator 153 has an output K for each antenna circuit K, and each output from the generator 153 generates a different code signal, the product outputs from the mixers 150C are each coded with a respective code which serves to identify the received signal when they are subsequently combined in adder 155. In this embodiment, the codes from the code generator 153 are pseudo random spreading codes all having a common bit rate, and each is superimposed using mixers 157 (one for each antenna circuit), with a local oscillator signal from a local oscillator source 159 common to the plurality of antennas circuits. Accordingly, the mixers 150C serve as down converters, converting the received signals to an intermediate frequency.

The summed i.f. signal from the output of the adder 155 is then fed through a common receiver channel consisting of an i.f. bandpass filter 161 and amplifier 163, whereafter the i.f. signal is digitised in ADC 165. At this point, as is the case with digital signals in each of the embodiments described in this specification, it is possible to process the signals using hardwired logic or software, and the associated diagrams and description are to be interpreted as covering both alternatives, including a combination of the two. Referring again, then, to FIG. 4, the output of the ADC 165 is fed to a plurality of channels 167, one for each antenna, each containing a mixer 167A which receives the same respective code as that applied in respect of the relevant antenna in mixers 150C. This has the effect of isolating the representation of the respective received signal at the output of the mixer 167A, this output representation then being split into plural sub-channels 169 corresponding to the satellites from which signals are received. As a result of the common processing of the antenna signal representations in the common i.f. channel, phase coherence for the signals received from each satellite at the different antennas is substantially maintained, yielding improvements in carrier phase measurement and discrimination.

Other embodiments of the invention may use multiple antennas but with different processing algorithms. Spatial diversity processing allows systems to survive certain forms of interference. If the antenna elements are spaced moderately closely with inter-element distances of the order of several wavelengths, it is usually possible to provide some protection against propagation path fading. This is determined by the ambiguity function of the transmission channel which exhibit spatial, temporal and frequency coherence. Providing the antenna element spacing is greater than the spatial coherence distance, the antennas receive signal versions subject to statistically independent path configurations.

A simple algorithm which can be used to gain some benefit from spatial diversity simply selects the (antenna) channel exhibiting the largest output signal. Channels with deep amplitude fades are excluded from making a contribution to the signal.

The optimum processing for randomly fading channels with a Rayleigh distributed amplitude probability density function is well known. The processor requires the summation of the weighted power from each channel. The optimum weighting is the 'a priori' signal to noise ratio. If, for instance, in a multi-path reception area, the channels support some portion of the direct path satellite signal, the amplitude distribution becomes Ricean (i.e. with one dominant component). The optimum processor is more complex in this case and, where possible, forms the coherent sum of the stable phase parts of the signal.

Such a system may be applicable to the more complex GPS processors in situations where the propagation path from the satellite is subject to significant fading behavior. Inside buildings, GPS signal reception is dominated by multi-path propagation with significant fading. An adaptive processor as described above offers the possibility of acceptable results in the variety of situations from direct signal path reception to multi-path dominated signal behaviour.

This concept is particularly applicable to mobile systems where the spatial and temporal signal fields have significant variation. It is more difficult to implement this in hand-held equipment due to the small physical size of the device in comparison with the coherence distance of the spatial signal field. Data relating to the signal ambiguity function in a variety of situations indicate that coherence distances of the order of 50 cm inside buildings may be expected. This is in accordance with the above-stated concept of signal interference on the scale of the GPS carrier wavelength. It will be appreciated, therefore, that implementation of spatial diversity is more applicable to vehicular applications due to the wider potential spacing of the antenna elements. The requirement for multiple antennas and the consequent need for coaxial cable connections within the vehicle is mitigated by printing the antennas on the rear screen and by locating at least a portion of the receiver unit in close proximity to the antenna output terminals.

Multi-element antenna systems have been described hereinbefore as a means to reduce multi-path signal propagation effects in ranging systems. It should be understood that this technique is useful in, at least, survey and timing applications of GPS as well as position-fixing.

Figure 5:
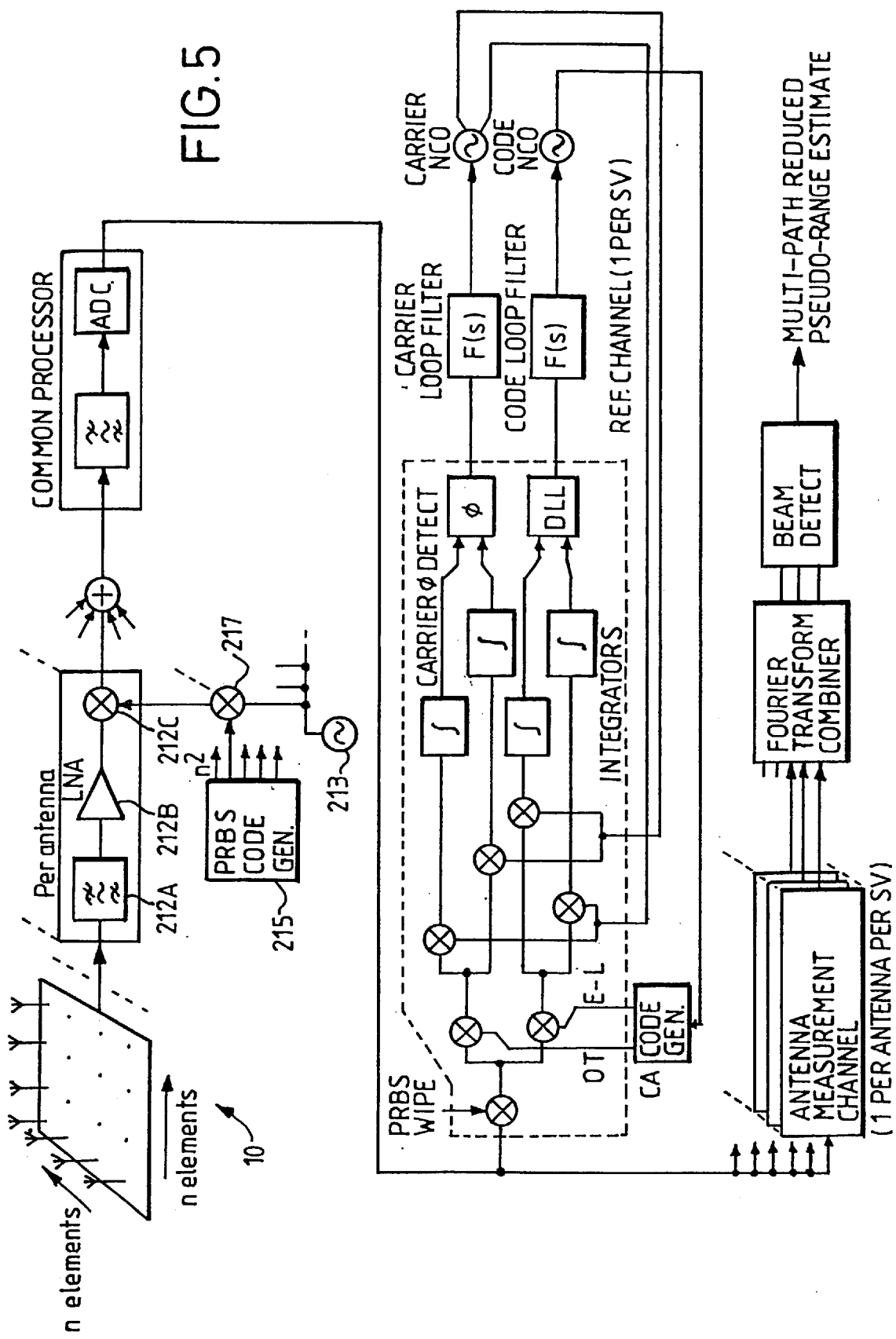
FIG. 5 is a block diagram of a fourth receiver system in accordance with the invention, designated particularly for mitigation of multi-path effects.

Alternative signal processing arrangements will now be described. Referring to FIG. 5, an antenna arrangement comprises a two dimensional array 10 of $n^2$ elements coupled through individual low-noise amplifiers (LNA's) to first down-converters. The simplest system arises when the antenna elements are uniformly spaced. Each down-converter 212B is driven by a common local oscillator 213 modulated with a distinct code chosen from a set of circularly non-correlated pseudo-random sequences, the code signals being derived, as in the embodiment of FIG. 4, from a multiple output code generator 215 and combined by respective mixers 217 with the local oscillator signal. Gold codes are well known examples of such sequences exhibiting bounded out-of-phase auto-correlation and cross-correlation properties. Gold codes with sequence lengths greater than 1023 are known and have the benefit of reducing the signal leakage between different sequences (or virtual antenna channels).

This, and subsequent processing elements are shown in FIG. 5, which is self-explanatory in the light of the following description and the above description of the other embodiments of the invention.

The dimensions of the antenna array 10 are small compared with the code wavelength of 300 m but large compared with the carrier wavelength. The inter-element spacing may take a range of values, but there is much to support the application of the Nyquist sampling theorem applied spatially. This requires that samples of the signal field must be taken with inter-element spacing of less than $\lambda/2$. The physical extent of the array is one of the design choices within the scope of the present invention and is related to the coherence distance of the GPS signal field derived from the scattering function. The antenna structure will be ineffective in reducing multi-path propagation effects if the array size is smaller than the coherence distance—longer arrays have smaller beam-widths (or circles of confusion if expressed optically).

Either a reference channel (processing signals from a selected antenna, as described above with reference to FIGS. 1 and 2), or a combination of channels, is used to generate a code-tracking signal using an early-late code replica. One such reference channel is provided for each satellite to be tracked. The code modulation is removed from the antenna processing channels by multiplication with an on-time code replica.

In this form, a large number of processing channels are required—of the order of $m \times n^2$, where m is the number of satellites to be tracked. However, the analysis effort can be reduced. One method for processing the output of an antenna array uses a Fourier Transform to convert the spatial samples into angular samples. Each such angular sample simply represents a beam pointing in one of directions defined by the transform. The beams have the characteristic of a linear summation of the antenna element outputs pre-multiplied by a linear phase taper. The beam patterns are mutually orthogonal as in classic Fourier Transform theory. There are many alternatives to the Fourier Transform processor, such as the generalised two-dimensional Karhunen-Loeve Transform.

The operation of each satellite processor may be viewed as a spatial filtering operation, in which, for non-adaptive processors, the signal beam containing the least disturbance from multi-path propagation is selected for code measurements and carrier tracking. For adaptive processors, the antenna element pre-multiplier (a linear phase taper for the example described above) is replaced with an amplitude and phase weighting function prior to antenna signal combination. Often, the simplest from of combiner is used (a summation device), however, other forms are possible. One combiner divides the antenna into two sub-arrays whose elements are summed. The output of the combiner is formed as the product of the two sub-array outputs.

Figure 6:
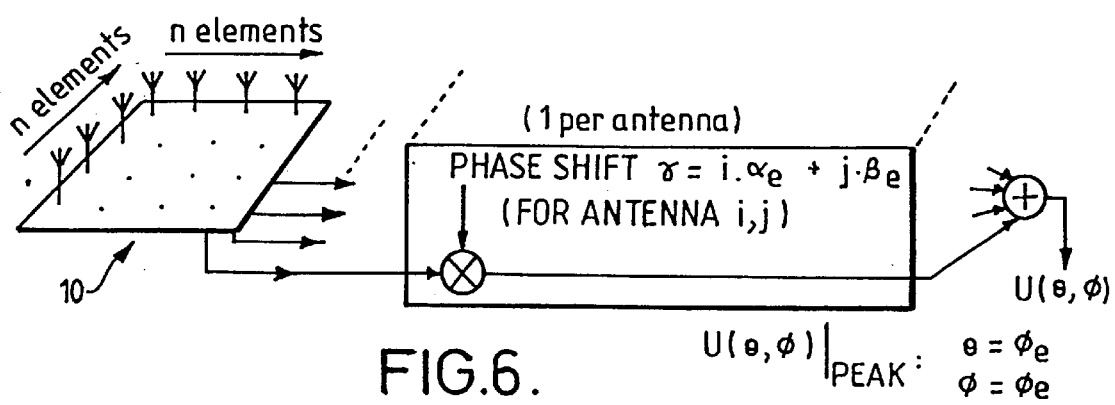
FIG. 6 is a diagram illustrating the front end of the GPS receiver with a circuit for applying a phase taper.

The spatial correlation function for a statistical average of a multi-path situation is defined as $\Re(\theta,\Phi)$. This is the equivalent of a communication channel scattering function (the transmission path from satellite to user receiver may be viewed as a communication path). A simple array-processing scheme is depicted in FIG. 6. In this system, each antenna element in the array 10 is weighted by a linear phase taper of $\alpha_c$ per element in the x-direction, $\beta_e$ in the y-direction and with uniform amplitude weighting. This causes a beam to be steered in a direction $(\theta_e, \phi_e)$ to the normal of the array. The beam pattern is $U(\theta,\phi)$:

The spatial auto-correlation function for the array output is $\Phi(\theta)$:

$$\Phi(\theta)=U^*(\theta,\phi).U(\theta,\phi).\Re(\theta,\phi)$$

where $U^*(\theta,\phi)$ is the complex conjugate of $U(\theta,\phi)$.

In most situations, this lower multi-path propagation disturbance if the peak in $U(\theta,\phi)$ selects substantially the direct path signal from the satellite. This is represented in $\Re(\theta,\phi)$ as a peak in $(\theta,\phi)$ corresponding the satellite transmitter (SV) direction whereas multi-path propagation effects form a 'halo' effect (statistically) around the peak.

Figure 7:
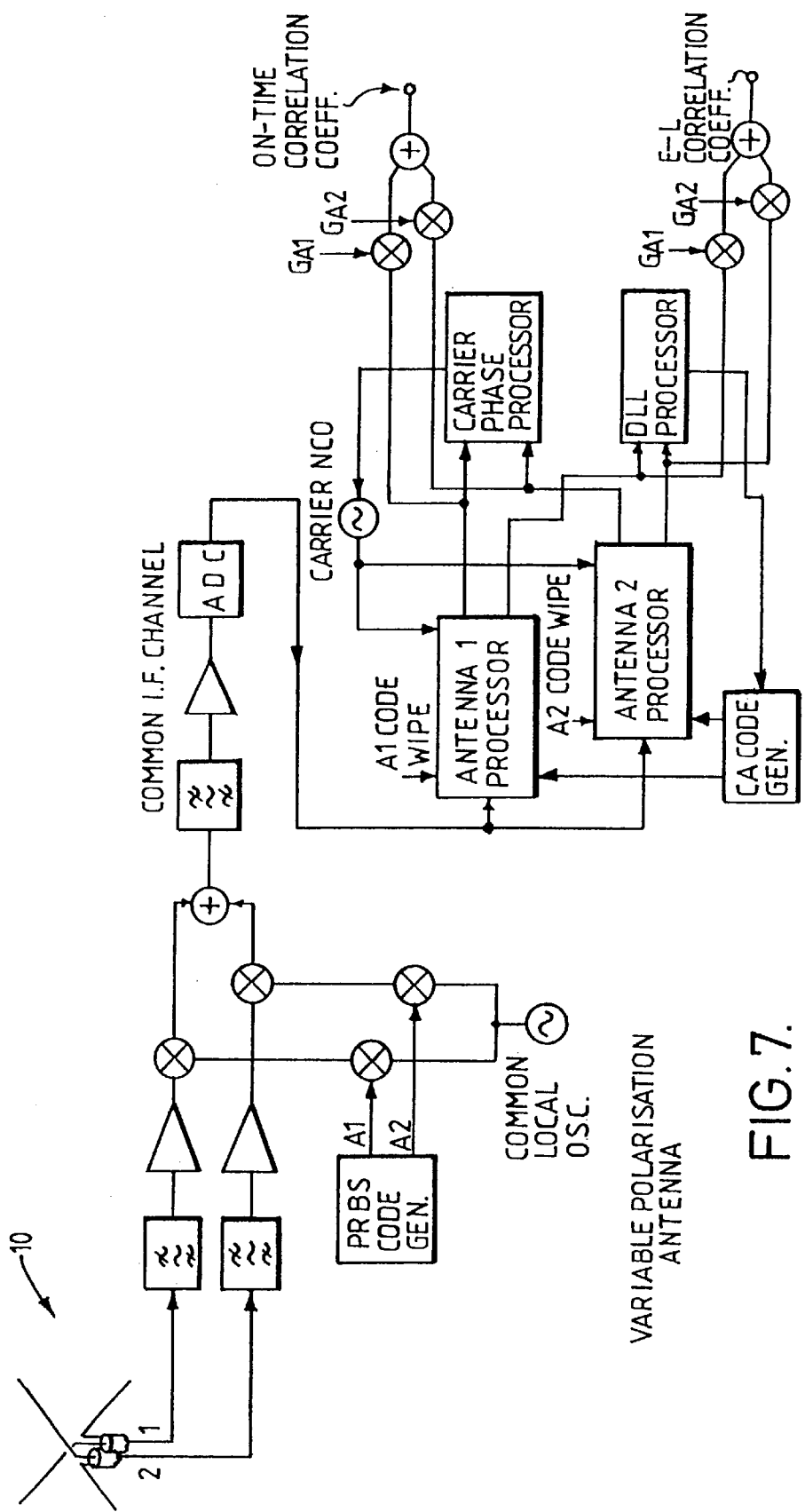
FIG. 7 is a block diagram of a fifth receiver system in accordance with the invention for selecting circularly or elliptically polarised signals.

Referring to FIG. 7, as a further embodiment of the invention, a GPS receiving system has a GPS crossed dipole arrangement 10 with each dipole connected to a respective input channel 250 in an arrangement analageous to that shown in FIG. 4. The two antenna signals are coupled through a common rf and if processing assembly, as in the FIG. 4 embodiment, which provides phase and group delay stable amplification, filtering and down-conversion. One way to provide for such processing is by means of code division multiplexing for two channels through a common hardware r.f. processor. Each channel is attached to a separate antenna element. Again as described and shown already, in the digital processing section of the GPS receiver the code division multiplex signals are separated into two channels again. Code and carrier tracking channels are formed for each decoded antenna channel. The code loop tracking positions are the same for each antenna. The carrier tracking loops produce phase and frequency estimates for the implicit GPS carrier signal.

Performance benefit may be taken by forming a single code tracking loop which is driven from a code phase error signal derived from both channels. Similarly, the carrier signal tracking loops share a common frequency but have different phases depending upon the direction and type of received signal. By forming the coherent sum and difference of the two (equally weighted) on-time signals from the carrier channels, both right and left hand circularly polarized receptors may be formed. This is representative of the behavior of a network located at the antennas which forms the sum and difference of the two received signals as shown in FIG. 7. The performance attributes, which accrue from the digital implementation, are several fold. These include a lack of network-induced antenna coupling, precise control of amplitude and phase of the coupling network, use of unequal weighting factors—allowing to elliptical polarization antenna structures, and adaptive control of the phase and amplitude weighting parameters, which provides near-optimum processing with uncertain and/or unstable signal polarization.

What is claimed is:

1. A position-fixing receiver arranged to receive simultaneously ranging signals produced by a plurality of remote transmitters which include at least one satellite and which form part of a satellite-based universal ranging system, wherein the apparatus comprises a radio receiver unit having a plurality of radio frequency (r.f.) input connections, and a plurality of spaced-apart antennas each connected to a respective said input connection, and wherein the receiver unit includes:

an antenna signal processing circuit responsive to the ranging signals for producing output signals including components each individually representative of at least one characteristic of the ranging signals received at a respective antenna a signal replica generator for generating replicas of the received ranging signals, and a signal combiner configured to receive the outout signals, to monitor, for each of a plurality of said remote transmitters, at least one characteristic of the ranging signals from that remote transmitter via the different antennas, and to weight one or more of said components to yield a range estimate.

2. A receiver according to claim 1, wherein the signal combiner is configured to weight the components according to the signal-to-noise ratios of the ranging signals received from at least one of the transmitters at the different antennas.

3. A receiver according to claim 2, wherein the signal combiner is configured to weight the components associated with the different antennas according to signal-to-noise ratios of the ranging signals from each of the transmitters.

4. A receiver according to claim 1, wherein the signal combiner is configured to weight the components according to the amplitudes of the ranging signals.

5. A receiver according to claim 1, wherein the antenna signal processing circuit includes at least one code-tracking loop for tracking code modulation of the said ranging signals when received by the antennas.

6. A receiver according to claim 1, wherein the signal combiner is configured to weight said components according to the multi-path content of the ranging signals received via the respective antennas.

7. A receiver according to claim 1, wherein the receiver unit further comprises:

a carrier phase tracking loop, and a phase-shifting arrangement operable to apply a selected phase shift to a weighted signal, the magnitude of the phase shift being dynamically adjusted according to the antenna via which the weighted signal is received.

8. A receiver according to claim 7, wherein the phase-shifting arrangement is configured to adjust the phase shift in a manner such as to maintain coherent phase matching between ranging signals received via the different antennas.

9. A receiver according to claim 7, wherein the phase-shifting arrangement is configured to adjust the phase shift in a manner such as to maintain coherent phase tracking while switching between different selected ranging signals from different antennas.

10. A receiver according to claim 1, wherein the receiver unit includes an adaptive equaliser arranged to set phase and/or amplitude taper multiplication coefficients for application to the ranging signals from the different antennas.

11. A receiver according to claim 1, including a de-spreader, and wherein the signal replica generator is operable to generate a plurality of code replicas and to feed the code replicas to the de-spreader, the signal combiner being downstream of the de-spreader.

12. A receiver according to claim 1, including a cross-correlation stage for correlating the received ranging signals with said replicas.

13. A receiver according to claim 1, including a parallel correlator stage.

14. A receiver according to claim 1, arranged to process the received ranging signals from said plurality of antennas in a phase-coherent manner.

15. A receiver according to claim 1, including a plurality of said signal combiners each performing a weighting function on ranging signals received via different said antennas for adjusting the signal replica generator to align said replicas with each of a plurality of respective ranging signals received from respective said remote transmitters.

16. A receiver according to claim 1, wherein the antennas have different polarization characteristics, and wherein the signal combiner is programmed to combine digitized representations of the different antenna signals to weight received signals having a predetermined polarization.

17. A receiver according to claim 1, wherein the antennas comprise a pair of antennas each formed as a linear element, the linear elements being arranged perpendicularly to each other, and wherein the signal combiner is programmed to weight and combine the digitized representations of the different antenna signals in order to select received signals of elliptical polarization.

18. A receiver according to claim 17, wherein the signal combiner is configured to implement sum and different networks.

19. A receiver according to claim 16, wherein the signal combiner is programmed so as to combine the digitized representations variably.

20. A receiver according to claim 19, wherein the signal combiner is programmed so as to combine the digitized representations in an adaptively varying manner in order to optimise signal reception in a multipath environment.

21. A receiver according to claim 1, wherein the ranging signals have a wavelength $\lambda$ in air and the antennas form an array having a maximum dimension greater than $5\lambda$.

22. A receiver according to claim 21, wherein the array comprises at least three antennas and the inter-antenna spacing of at least a pair of the antennas is less than or equal to $\lambda/2$.

23. A receiver according to claim 1, wherein the antennas are spaced apart by distances of at least 50 mm.

24. A vehicle including a receiver according to claim 1, the antennas being mounted in different parts of the vehicle.

25. A vehicle according to claim 24, including at least three antennas connected to the receiver unit, one mounted in each of the two door or wing mirror housings, and one in a rear part of the vehicle.

26. A vehicle according to claim 25, including at least one antenna mounted in or on the vehicle windscreen.

27. A position-fixing receiver arranged to receive simultaneously ranging signals produced by a plurality of remote transmitters which include at least one satellite and which form part of a satellite-based universal ranging system, wherein the apparatus comprises a radio receiver unit having a plurality of radio frequency (r.f.) input connections, and a plurality of spaced-apart antennas each connected to a respective said input connection, and wherein the receiver unit includes:

an antenna signal processing circuit responsive to the ranging signals for producing output signals including components each individually representative of at least one characteristic of the ranging signals received at a respective antenna, a code-tracking loop, and a signal combiner configured to receive the output signals, to monitor, for each of a plurality of said remote transmitters, at least one characteristic of the ranging signals from that remote transmitter via the different antennas, and to weight one or more of said components to yield a range estimate.

28. A position-fixing receiver arranged to receive simultaneously ranging signals produced by a plurality of remote transmitters which include at least one satellite and which form part of a satellite-based universal ranging system, wherein the apparatus comprises a radio receiver unit having a plurality of radio frequency (r.f.) input connections, and a plurality of spaced-apart antennas each connected to a respective said input connection, and wherein the receiver unit includes:

an antenna signal processing circuit responsive to the ranging signals for producing output signals including components each individually representative of at least one characteristic of the ranging signals received at a respective antenna a signal replica generating replicas of the received ranging signals, and a signal selection arrangement configured to receive the output signals, to monitor, for each of a plurality of said remote transmitters, at least one characteristic of the ranging signals from that remote transmitter via the different antennas, and to select one or more of said components to yield a range estimate.

29. A receiver according to claim 28, including a de-spreader, and wherein the signal replica generator is operable to generate a plurality of code replicas and to feed the code replicas to the de-spreader, the signal combiner being downstream of the de-spreader.

30. A receiver according to claim 28, including a cross-correlation stage for correlating the received ranging signals with said replicas.

31. A receiver according to claim 28, including a parallel correlator stage.

32. A receiver according to claim 28, arranged to process the received ranging signals from said plurality of antennas in a phase-coherent manner.

33. A receiver according to claim 28, wherein the signal selection arrangement is configured to select the components according to the signal-to-noise ratios of the ranging signals received from at least one of the transmitters at the different antennas.

34. A receiver according to claim 33, wherein the signal selection arrangement is configured to select the components associated with the different antennas according to signal-to-noise ratios of the ranging signals from each of the transmitters.

35. A receiver according to claim 28, wherein the signal selection arrangement is configured to select the components according to the amplitudes of the ranging signals.

36. A receiver according to claim 28, wherein the antenna signal processing circuit includes at least one code-tracking loop for tracking code modulation of said ranging signals when received by the antennas.

37. A receiver according to claim 28, wherein the signal selection arrangement is configured to select the said components according to the multi-path content of the ranging signals received via the respective antennas.

38. A receiver according to claim 28, wherein the receiver unit further comprises:

a carrier phase tracking loop, and a phase-shifting arrangement operable to apply a selected phase shift to a selected signal, the magnitude of the phase shift being dynamically adjusted according to the antenna via which the selected signal is received.

39. A receiver according to claim 38, wherein the phase-shifting arrangement is configured to adjust the phase shift in a manner such as to maintain coherent phase matching between ranging signals received via the different antennas.

40. A receiver according to claim 38, wherein the phase-shifting arrangement is configured to adjust the phase shift in a manner such as to maintain coherent phase tracking while switching between different selected ranging signals from different antennas.

41. Apparatus according to claim 28, wherein the receiver unit includes an adaptive equaliser arranged to set phase and/or amplitude taper multiplication coefficients for application to the ranging signals from the different antennas.

42. A receiver according to claim 28, wherein the antennas have different polarization characteristics, and wherein the signal selection arrangement is programmed to combine digitized representations of the different antenna signals to select received signals having a predetermined polarization.

43. A receiver according to claim 42, wherein the antennas comprise a pair of antennas each formed as a linear element, the linear elements being arranged perpendicularly to each other so that, according to the way in which the digitized representations of the signals are combined, the receiver unit selects received signals of right-hand circular polarization or left-hand circular polarization.

44. A receiver according to claim 43, wherein the signal selection arrangement is configured to implement sum and difference networks.

45. A receiver according to claim 42, wherein the signal selection arrangement is programmed so as to combine the digitized representations variably.

46. A receiver according to claim 45, wherein the signal selection arrangement is programmed so as to combine the digitized representations in an adaptively varying manner in order to optimise signal reception in a multipath environment.

47. A receiver according to claim 28, wherein ranging signals have a wavelength $\lambda$ in air and form an array having a maximum dimension greater than $5\lambda$.

48. A receiver according to claim 47, wherein the array comprises at least three antennas and the inter-antenna spacing of at least a pair of the antennas is less than or equal to $\lambda/2$.

49. A receiver according to claim 28, wherein the antennas are spaced apart by distances of at least 50 mm.

50. A vehicle including a receiver according to claim 28, the antennas being mounted in different parts of the vehicle.

51. A vehicle according to claim 50, including at least three antennas connected to the receiver unit, one mounted in each of two door or wing mirror housings, and one in a rear part of the vehicle.

52. A vehicle according to claim 51, including at least one antenna mounted in or on the vehicle windscreen.

53. Apparatus arranged to receive ranging signals produced by a plurality of remote transmitters which form part of a universal ranging system, wherein the apparatus comprises a radio receiver unit having a plurality of r.f. input channels and a plurality of spaced-apart antennas each connected to a respective said input channel, wherein:

the receiver unit includes at least one antenna signal processing circuit responsive to the carrier phases of the ranging signals received via at least one of the antennas, each input channel i includes a multiplying element arranged to combine a respective first multiplier signal $M_i$ with an incoming signal in the channel, the multiplier signals constituting an orthogonal set of signals, and the receiver unit further includes a combining element for combining the multiplier output signals resulting from combining the incoming signals with the multiplier signals, a common intermediate frequency channel including common filtering means for receiving the multiplier output signals from the combining element, an analog-to-digital converter (ADC) coupled to an output of the common channel, and a processor for applying second multiplier signals to a digitized signal obtained from the ADC thereby substantially to isolate from each other signals representative of respective incoming signals from respective antennas, each second multiplier signal corresponding to or being the same as the first multiplier signal for the respective antenna, whereby phase coherence is maintained between the different signals associated with the different antennas.

54. Apparatus according to claim 53, wherein the antennas have different polarization characteristics, and wherein the processor is programmed to combine the digitized representations of the different antenna signals to weight or select received signals having a predetermined polarization.

55. Apparatus according to claim 54, wherein the antennas comprise a pair of antennas each formed as a linear element, the linear elements being arranged perpendicularly to each other so that, according to the way in which the digitized representations of the signals are combined, the receiver unit selects received signals of right-hand circular polarization or left-hand circular polarization.

56. Apparatus according to claim 53, wherein the antennas comprise a pair of antennas each formed as a linear element, the linear elements being arranged perpendicularly to each other, and wherein the processor is programmed to weight and combine the digitized representations of the different antenna signals in order to select received signals of elliptical polarization.

57. Apparatus according to claim 55, wherein the processor is configured to implement sum and difference networks.

58. Apparatus according to claim 54, wherein the processor is programmed so as to combine the digitized representations variably.

59. Apparatus according to claim 58, wherein the processor is programmed so as to combine the digitized representations in an adaptively varying manner in order to optimise signal reception in a multipath environment.

60. Apparatus according to claim 53, wherein the processor is programmed to apply selected weightings to the isolated signals in order to tailor the response of the receiver unit to favour received signals having a predetermined characteristic.

61. Apparatus according to claim 60, wherein the weightings are adaptively variable.

62. Apparatus according to claim 53, wherein the receiver unit has input channels which include a pair of sub-channels for I and Q components of the respective incoming signal, and wherein the processor is programmed to combine the said I and Q components after isolation of the signals representative of the incoming signals.

63. Apparatus according to claim 53, wherein the multiplying element is arranged to combine a respective spreading code $A_i$ with the incoming signal in the channel and the processor is arranged to apply corresponding despreading codes $B_i$ to the digitised signal obtained from the ADC for extracting the signals representative of the incoming signals from the respective antennas.

64. Apparatus according to claim 53, arranged to receive ranging signals from remote transmitters which include at least one earth-orbiting satellite.

65. Apparatus according to claim 64, arranged to receive ranging signals from remote transmitters all of which are earth-orbiting satellites.

66. Apparatus according to claim 53, wherein the ranging signals have a wavelength $\lambda$ in air and the antennas form an array having a maximum dimension greater than $5\lambda$.

67. Apparatus according to claim 66, wherein the array comprises at least three antennas and the inter-antenna spacing of at least a pair of the antennas is less than or equal to $\lambda/2$.

68. Apparatus according to claim 53, wherein the antennas are spaced apart by distances at least 50 mm.

69. A vehicle including apparatus according to claim 53, the antennas being mounted in different parts of the vehicle.

70. A vehicle according to claim 69, including at least three antennas connected to the receiver unit, one mounted in each of two door or wing mirror housings, and one in a rear part of the vehicle.

71. A vehicle according to claim 70, including at least one antenna mounted in or on the vehicle windscreen.

72. Apparatus arranged to receive ranging signals produced by a plurality of remote transmitters which form part of a universal ranging system, wherein the apparatus comprises a radio receiver unit having a plurality of radio-frequency (r.f.) input channels, and a plurality of spaced-apart antennas each connected to a respective said input channel, wherein the receiver unit includes an arrangement for coherently combining, processing and separating signals representative of the ranging signals received by the antennas from each of a plurality of the transmitters, the arrangement including a common signal processing channel including common filtering means to maintain phase coherence between the separated signals associated with any one of said transmitters.

73. A receiver according to claim 35, wherein the antenna signal processing circuit includes at least one code-tracking loop for tracking code modulation of said ranging signals when received by the antennas, and wherein the signal selection arrangement is configured periodically to select one of the said ranging signals, the amplitude of which is greater than that of the other ranging signals or at least one of the other ranging signals, and to apply the selected signal to the code tracking loop.

74. A receiver according to claim 36, having a plurality of code tracking loops, wherein the signal selection arrangement is configured periodically to select a plurality of said ranging signals by weighting the magnitudes of the ranging signals according to a predetermined weighting scheme.

75. A receiver according to claim 74, wherein the weighting scheme is dynamically variable.

76. A position-fixing receiver arranged to receive simultaneously ranging signals produced by a plurality of remote transmitters which include at least one satellite and which form part of a satellite-based universal ranging system, wherein the apparatus comprises a radio receiver unit having a plurality of radio frequency (r.f.) input connections, and a plurality of spaced-apart antennas each connected to a respective said input connection, and wherein the receiver unit includes:

an antenna signal processing circuit responsive to the ranging signals for producing output signals including components each individually representative of at least one characteristic of the ranging signals received at a respective antenna, a code-tracking loop, and a signal selection arrangement configured to receive the output signals, to monitor, for each of a plurality of said remote transmitters, at least one characteristic of the ranging signals from that remote transmitter via the different antennas, and to select one or more of said components to yield a range estimate.

* * * * *